US012139353B2

(12) United States Patent
Ohta et al.

(10) Patent No.: US 12,139,353 B2
(45) Date of Patent: Nov. 12, 2024

(54) ARTICLE CONVEYANCE APPARATUS

(71) Applicant: SHIBUYA CORPORATION, Kanazawa (JP)

(72) Inventors: Masato Ohta, Kanazawa (JP); Takashi Miyazaki, Kanazawa (JP); Yusuke Shimizu, Kanazawa (JP)

(73) Assignee: SHIBUYA CORPORATION, Kanazawa (JP)

( * ) Notice: Subject to any disclaimer, the term of this patent is extended or adjusted under 35 U.S.C. 154(b) by 58 days.

(21) Appl. No.: 18/326,088

(22) Filed: May 31, 2023

(65) Prior Publication Data

US 2023/0399184 A1 Dec. 14, 2023

(30) Foreign Application Priority Data

Jun. 9, 2022 (JP) ................................. 2022-093926

(51) Int. Cl.
- *B65G 54/02* (2006.01)
- *B65G 41/00* (2006.01)
- *H02K 41/03* (2006.01)

(52) U.S. Cl.
CPC .......... *B65G 54/02* (2013.01); *B65G 41/005* (2013.01); *H02K 41/031* (2013.01); *H02K 41/033* (2013.01)

(58) Field of Classification Search
CPC .... B65G 54/02; B65G 41/005; H02K 41/031; H02K 41/033
USPC ................................................ 198/580, 805
See application file for complete search history.

(56) References Cited

U.S. PATENT DOCUMENTS

| | | | | |
|---|---|---|---|---|
| 2,861,672 A | * | 11/1958 | Buhrer | F16H 35/02 475/14 |
| 5,090,555 A | * | 2/1992 | Kura | B65G 35/06 198/465.1 |
| 9,856,096 B2 | | 1/2018 | Hanisch et al. | |
| 11,548,740 B2 | * | 1/2023 | Lasserre | B65G 54/02 |
| 2015/0144462 A1 | * | 5/2015 | Weiss | B65G 54/02 198/619 |
| 2020/0354166 A1 | * | 11/2020 | Abe | B65H 5/14 |
| 2023/0073969 A1 | * | 3/2023 | Hogan | B65G 54/02 |

FOREIGN PATENT DOCUMENTS

| | | | | |
|---|---|---|---|---|
| CN | 108701637 A | * | 10/2018 | ............. B65G 35/06 |
| CN | 113401666 A | * | 9/2021 | ............. B65G 54/02 |
| EP | 4393852 A1 | * | 7/2024 | ............. B65G 17/12 |
| JP | 2016531058 A | | 10/2016 | |

* cited by examiner

*Primary Examiner* — James R Bidwell
(74) *Attorney, Agent, or Firm* — FLYNN THIEL, P.C.

(57) ABSTRACT

An article conveyance apparatus conveys containers with carriers moved by a linear driving apparatus. The article conveyance apparatus includes a first upper side linear conveyance rail, a second lower side linear conveyance rail, a first delivery unit that is inverted while holding the carriers to deliver the carriers from a downstream end of the first conveyance rail to an upstream end of the second conveyance rail. A second delivery unit that is inverted while holding the plurality of carriers, delivers the carriers from a downstream end of the second conveyance rail to an upstream end of the first conveyance rail. An interval between the first conveyance rail (forward path) and the second conveyance rail (return path) is reduced as compared with an existing article conveyance apparatus.

3 Claims, 6 Drawing Sheets

ARTICLE CONVEYANCE APPARATUS

BACKGROUND OF THE INVENTION

Field of the Invention

The present invention relates to an article conveyance apparatus, and more specifically to an article conveyance apparatus that conveys articles by moving a plurality of carriers holding the respective articles by a linear driving apparatus.

Description of the Related Art

An article conveyance apparatus that conveys articles by moving a plurality of carriers holding the respective articles by a linear driving apparatus has been known (for example, see Japanese Translation of PCT International Application Publication No. 2016-531058).

In the article conveyance apparatus disclosed in Japanese Translation of PCT International Application Publication No. 2016-531058, a circulation conveyance path in which a forward path for the carriers is located on an upper side and a return path is located on a lower side is adopted, and each of the carriers is independently moved along a conveyance rail by the linear driving apparatus, to convey the articles held by the respective carriers.

The article conveyance apparatus using the linear driving apparatus disclosed in Japanese Translation of PCT International Application Publication No. 2016-531058 has the following issues. Dimensions of components of the linear driving apparatus are determined by each manufacturer. Therefore, when the above-described circulation conveyance path in which the forward path and the return path for the carriers has vertical relationship is adopted, it is necessary to secure arc-shaped conveyance paths connecting the forward path and the return path. This causes upsizing of the linear driving apparatus, and accordingly increases an installation space of the article conveyance apparatus.

SUMMARY OF THE INVENTION

In consideration of the above-described circumstances, according to the present invention, there is provided an article conveyance apparatus including a plurality of carriers each provided with a permanent magnet and each configured to hold an article at a required position and to be moved, a conveyance rail configured to move the plurality of carriers along a circulation conveyance path, a plurality of electromagnetic coils disposed along the circulation conveyance path, and a control apparatus configured to excite the electromagnetic coils to move the carriers along the circulation conveyance path, and configured to convey the articles held by the carriers, characterized in that the conveyance rail includes a first conveyance rail having a linear shape and serving as a forward path to move the carriers along the circulation conveyance path, and a second conveyance rail having a linear shape, disposed in parallel to and separately from the first conveyance rail, and serving as a return path to move the carriers along the circulation conveyance path, a first delivery unit configured to rotate after receiving the plurality of carriers from a downstream end of the first conveyance rail, and to deliver the carriers to an upstream end of the second conveyance path, and a second delivery unit configured to rotate after receiving the plurality of carriers from a downstream end of the second conveyance rail, and to deliver the carriers to an upstream end of the first conveyance rail are provided, the circulation conveyance path is configured by the first conveyance rail, the first delivery unit, the second conveyance rail, and the second delivery unit, and each of the first delivery unit and the second delivery unit includes a linear rail provided with a plurality of electromagnetic coils in a longitudinal direction and configured to receive the plurality of carriers, and a rotation unit configured to rotate the linear rail.

According to such a configuration, providing the above-described delivery units makes it possible to omit the arc-shaped conveyance paths that are necessary in the existing article conveyance apparatus. This makes it possible to reduce an interval between the first conveyance rail and the second conveyance rail, as compared with the existing article conveyance apparatus. Accordingly, it is possible to reduce an installation space of the article conveyance apparatus as compared with the existing article conveyance apparatus.

DETAILED DESCRIPTION OF THE PREFERRED EMBODIMENTS

Figure 1:
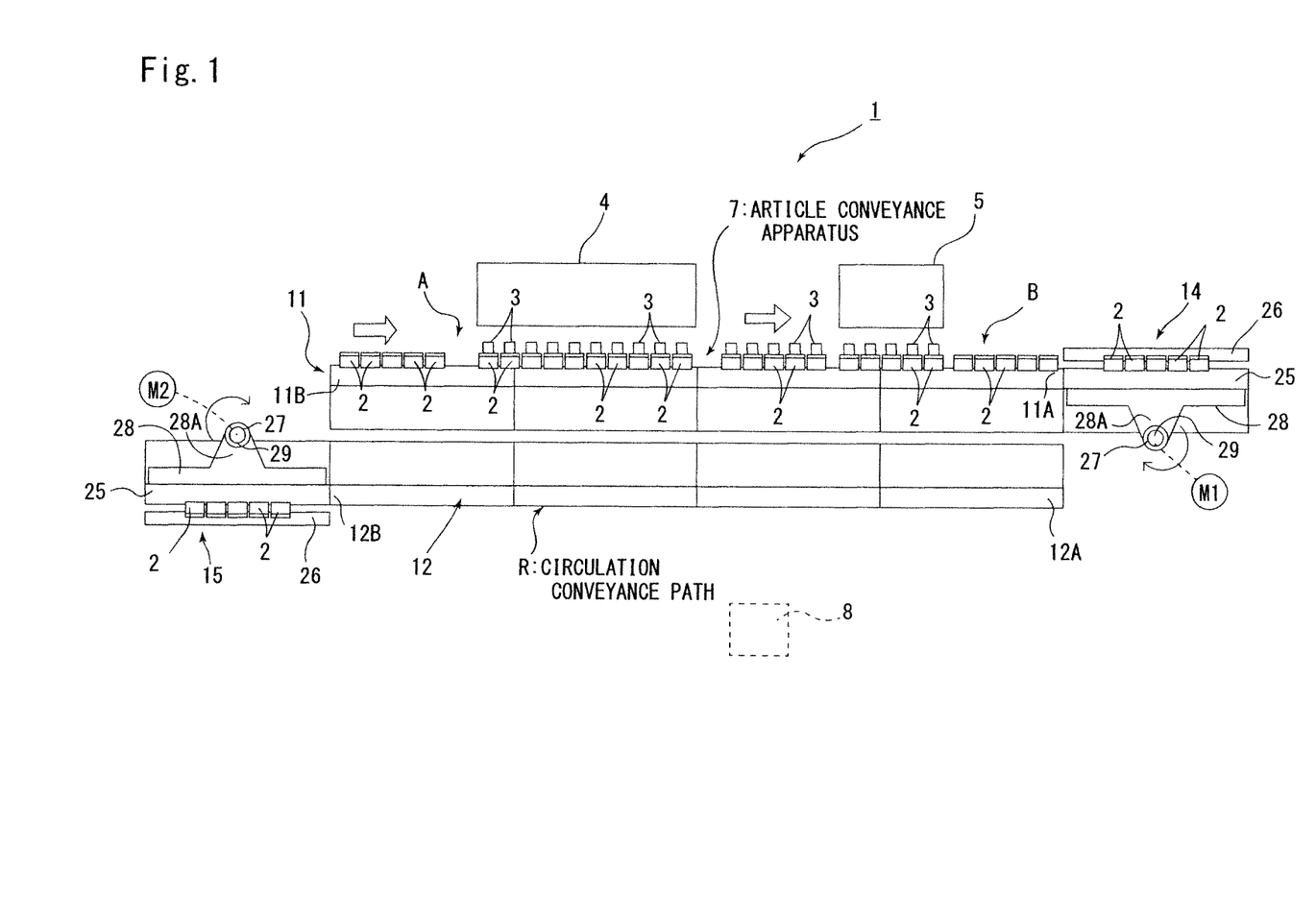
FIG. 1 is a front view illustrating a first embodiment of the present invention.
Figure 2:
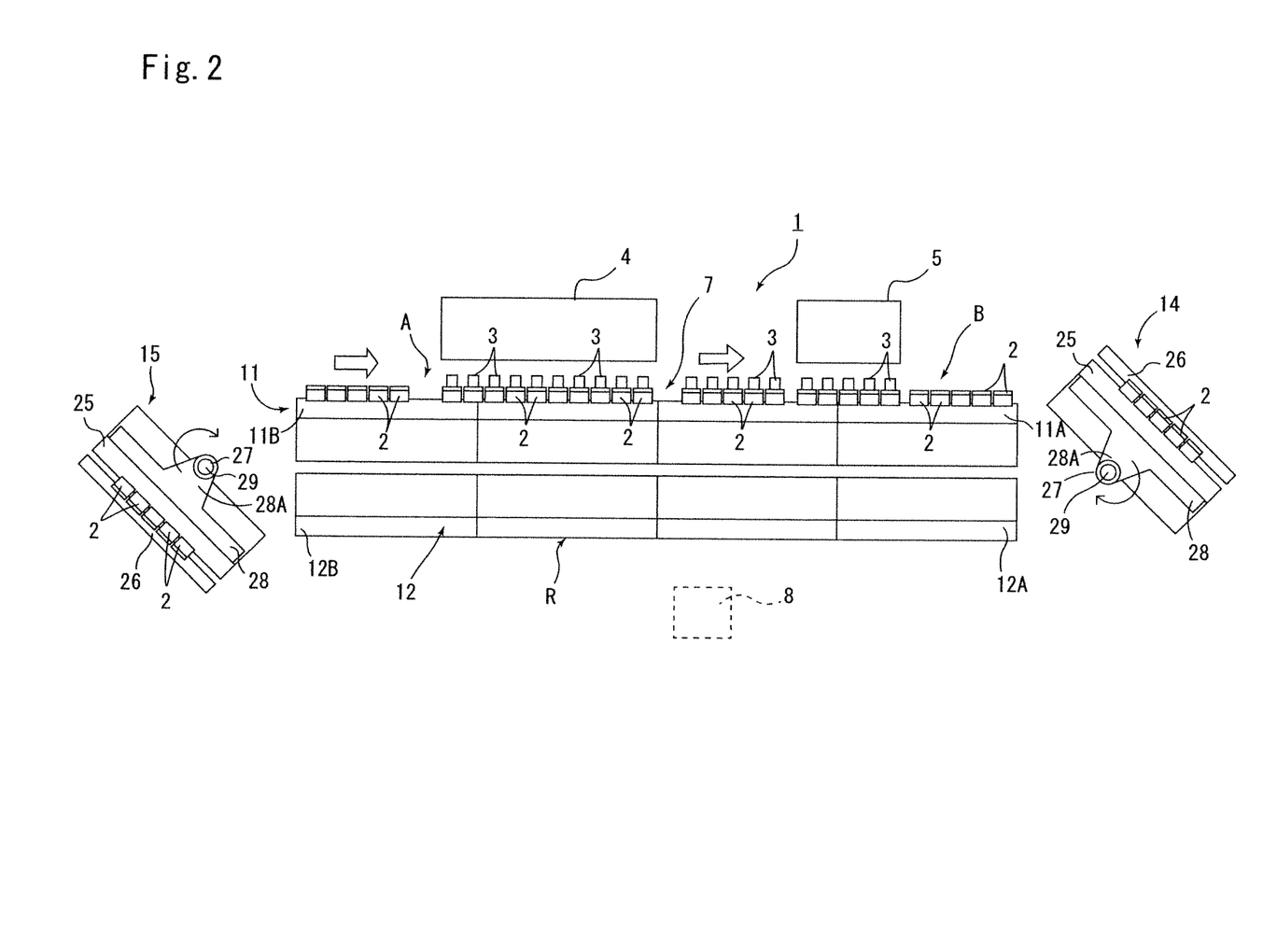
FIG. 2 is a front view illustrating a state different from a state in FIG. 1.
Figure 3:
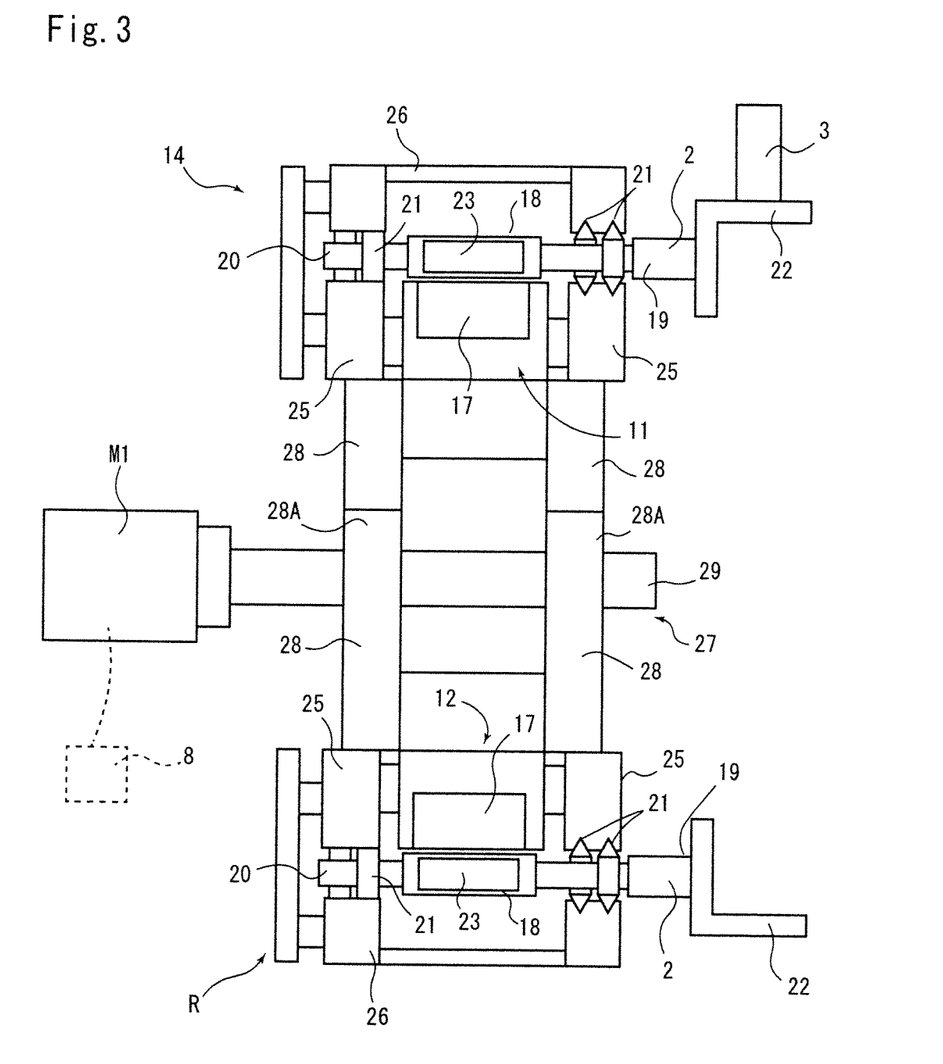
FIG. 3 is a right side view of a main part in FIG. 1.

Illustrated embodiments of the present invention are described below. In FIG. 1 to FIG. 3, a reference numeral 1 denotes an article handling system. In the article handling system 1, a filling apparatus 4 fills each of empty containers 3 with filling liquid while the containers 3 are conveyed in an arrow direction by a large number of carriers 2. Thereafter, a capper 5 attaches an unillustrated cap to an upper end opening of each of the containers 3.

The article handling system 1 includes: an article conveyance apparatus 7 conveying the containers 3 as articles in the arrow direction by the large number of carriers 2; the filling apparatus 4 that is disposed on an upper side of a conveyance path for the containers 3 in the article conveyance apparatus 7 and fills each of the containers 3 with the filling liquid; the capper 5 that is disposed on a downstream side of the filling apparatus 4 and attaches the cap to the opening of each of the containers 3; and a control apparatus 8 controlling operation of these components.

An unillustrated supply robot is disposed at a supply position A adjacent to and on the upstream side of the filling apparatus 4. The empty containers 3 are supplied from the supply robot to the respective carriers 2 stopped at the supply position A, and are held by the respective carriers 2. Further, an unillustrated discharge robot is disposed at a discharge position B adjacent to and on the downstream side of the capper 5. While the carriers 2 holding the respective capped containers 3 are stopped at the discharge position B, the containers 3 are taken out from the respective carriers 2 by the discharge robot, and are discharged onto an unillustrated discharge conveyer.

The article conveyance apparatus 7 has a configuration to circulate and move the carriers 2 in a circulation conveyance path R along a vertical plane, by a linear driving apparatus using a linear motor. The article conveyance apparatus 7 according to the present embodiment includes: a first conveyance rail 11 that is horizontally disposed on an upper side and extends along a conveyance direction of the containers 3; a second conveyance rail 12 that is horizontally disposed below the first conveyance rail 11 and extends along the conveyance direction; a first delivery unit 14 that delivers the plurality of carriers 2 from a downstream end 11A of the first conveyance rail 11 to an upstream end 12A of the second conveyance rail 12; a second delivery unit 15 that delivers the plurality of carriers 2 from a downstream end 12B of the second conveyance rail 12 to an upstream end 11B of the first conveyance rail 11; and the large number of carriers 2 that are circulated and moved among the first conveyance rail 11, the second conveyance rail 12, and the delivery units 14 and 15.

In the present embodiment, the circulation conveyance path R that circulates and moves the large number of carriers 2 on the vertical plane is formed by the first conveyance rail 11, the second conveyance rail 12, the first delivery unit 14, and the second delivery unit 15. Further, a region provided with the first conveyance rail 11 serves as a forward path to move the carriers 2, and the forward path serves as a conveyance path in which the carriers 2 hold and convey the containers 3. On an upper side of the conveyance path serving as the forward path, the supply position A, the filling apparatus 4, the capper 5, and the discharge position B are provided in this order. Further, a region provided with the second conveyance rail 12 serves as a return path to move the carriers 2.

As illustrated in FIG. 3, a large number of electromagnetic coils 17 are embedded in the first conveyance rail 11 in line along the conveyance direction (longitudinal direction). These electromagnetic coils 17 are excited at respective required timings by the control apparatus 8.

A large number of shuttles 18 are arranged in line along the conveyance direction, at upper positions near the first conveyance rail 11, and permanent magnets 23 are embedded in the respective shuttles 18.

A coupling shaft 19 is horizontally coupled to one side of each of the shuttles 18, and a supporting shaft 20 is horizontally coupled to another side of each of the shuttles 18. Rollers 21 are rotatably attached to the coupling shafts 19 and the supporting shafts 20, and these rollers 21 roll on placement surfaces on both sides of the first conveyance rail 11.

A gripper 22 holding one container 3 through a supporting member is attached to each of the coupling shafts 19. In the present embodiment, each carrier 2 is configured by the shuttle 18, the coupling shaft 19, the gripper 22, the supporting shaft 20, and the rollers 21. Further, when the containers 3 are supplied to the carriers 2 by the above-described supply robot while the carriers 2 are stopped at the above-described supply position A, the containers 3 are held by the grippers 22. Thereafter, the carriers 2 hold the containers 3 by the grippers 22, and convey the containers 3 from the supply position A to the discharge position B. In the present embodiment, each carrier 2 includes the gripper 22, and the gripper 22 holds the container 3; however, the gripper 22 may be omitted, and the container 3 may be simply held on the supporting member.

The linear driving apparatus is configured by the large number of electromagnetic coils 17 embedded in the first conveyance rail 11 in the conveyance direction and the permanent magnets 23 of the respective carriers 2. When the electromagnetic coils 17 at the required positions are excited by the control apparatus 8, each of the carriers 2 can be moved from the upstream end 11B to the downstream end 11A of the first conveyance rail 11, and can be stopped at the required positions. In other words, the linear driving apparatus can convey the containers 3 held by the carriers 2 from the supply position A to the discharge position B, and can stop the containers 3 at positions below the filling apparatus 4, positions below the capper 5, the above-described supply position A, and the above-described discharge position B, between the supply position A and the discharge position B. Further, the empty containers 3 of the carriers 2 stopped below the filling apparatus 4 are filled with the filling liquid by the filling apparatus 4, and the filled containers 3 of the carriers 2 stopped below the capper 5 are capped by the capper Note that the configuration of the linear driving apparatus using the linear motor has been known as disclosed in Japanese Translation of PCT International Application Publication No. 2016-531058 described above and the like.

As described above, the large number of electromagnetic coils 17 are embedded in the first conveyance rail 11. In the present embodiment, the electromagnetic coils 17, electric wires and accessories thereof, supporting members supporting the first conveyance rail 11 at a predetermined height, and the like are disposed so as not to be bulky in an adjacent region below the first conveyance rail 11.

The first conveyance rail 11 and the plurality of carriers 2 are described above. The second conveyance rail 12 according to the present embodiment has the configuration same as the configuration of the first conveyance rail 11, and is disposed upside down. In plan view, an installation region (forward path) of the first conveyance rail 11 and an installation region (return path) of the second conveyance rail 12 are identical, and the first conveyance rail 11 overlaps with the second conveyance rail 12.

The large number of electromagnetic coils 17 are also embedded in the second conveyance rail 12 along the conveyance direction (longitudinal direction) (see FIG. 3), and these electromagnetic coils 17 are excited at respective required timings by the control apparatus 8 in a manner similar to the first conveyance rail 11.

The carriers 2 that become empty after the containers 3 are taken out at the discharge position B of the first conveyance rail 11 are inverted by 180 degrees, and are then delivered, in an inverted state, from the downstream end 11A of the first conveyance rail 11 to the upstream end 12A of the second conveyance rail 12 through the first delivery unit 14 described in detail below. Further, the carriers 2 that have been inverted and delivered to the second conveyance rail 12 are moved from the upstream end 12A to the downstream end 12B by excitation of the electromagnetic coils 17 at the required positions of the second conveyance rail 12 by the control apparatus 8. Thereafter, the inverted carriers 2 are inverted by 180 degrees, and are then delivered from the downstream end 12B of the second conveyance rail 12 to the upstream end 11B of the first conveyance rail 11 through the second delivery unit 15 described in detail below (see FIG. 1 and FIG. 2). In such a manner, the empty carriers 2 before holding the containers 3 are returned onto the first conveyance rail 11. As described above, in the present embodiment, the circulation conveyance path R is formed by the first conveyance rail 11, the first delivery unit 14, the second conveyance rail 12, and the second delivery unit 15.

Accordingly, the present embodiment is obtained by omitting the arc-shaped conveyance path in an existing elliptical continuous circulation conveyance path, and is characterized in that the first delivery unit 14 and the second delivery unit 15 each rotating normally and reversely by 180 degrees are provided instead.

As illustrated in FIG. 1 to FIG. 3, the first delivery unit 14 includes: a linear rail 25 that has a linear shape, receives the plurality of carried-in carriers 2, and guides movement of the plurality of carriers 2; a fall prevention guide 26 that prevents the carriers 2 on the linear rail 25 from falling when the linear rail 25 is inverted from an ascended position to a descended position on a lower side; and a rotation unit 27 that rotates the linear rail 25 and the fall prevention guide 26 as one body by 180 degrees alternately.

The linear rail 25 is coupled to a linear upper surface of a supporting member 28, and the fall prevention guide 26 is also coupled to the supporting member 28 through unillustrated brackets. An interval between a placement surface of the linear rail 25 and the fall prevention guide 26 has a dimension sufficient to receive the rollers 21 of the carriers 2 without a gap.

A protrusion 28A protruding in a direction orthogonal to the longitudinal direction is provided at a center in the longitudinal direction on a lower surface of the supporting member 28. A rotary shaft 29 orthogonal to the conveyance direction is fitted into a through hole of the protrusion 28A, and a driving shaft of a motor M1 is coupled to the rotary shaft 29.

Operation of the motor M1 is controlled by the control apparatus 8 so as to rotate normally and reversely. When the control apparatus 8 normally and reversely rotates the motor M1, the linear rail 25 is alternately moved to the ascended position where the linear rail 25 is horizontally supported on the upper side (state illustrated by solid line in FIG. 1) and the descended position where the linear rail 25 is inverted by 180 degrees from the ascended position and is horizontally supported on the lower side.

At the ascended position illustrated in FIG. 1, the linear rail 25 is horizontally supported at the same height of the first conveyance rail 11 and on an extension line of the first conveyance rail 11, and one end (upstream end) of the linear rail 25 is connected to the downstream end 11A of the first conveyance rail 11. The plurality of electromagnetic coils 17 are embedded in the linear rail 25 in the longitudinal direction, and these electromagnetic coils 17 are also excited by the control apparatus 8.

As described above, when the linear rail 25 is at the ascended position, the control apparatus 8 excites the electromagnetic coils 17 of the first conveyance rail 11 and the linear rail 25, moves the carriers 2 from which the containers 3 have been taken out at the discharge position B of the first conveyance rail 11, from the first conveyance rail 11 onto the linear rail 25 of the first delivery unit 14 through the downstream end 11A, and stops the carriers 2. In the present embodiment, five shuttles 18 (carriers 2) are received and stopped on the linear rail 25. The rollers 21 of the five carriers 2 carried onto the linear rail 25 in the above-described manner are sandwiched between the fall prevention guide 26 and the linear rail 25.

Further, in a state where the electromagnetic coils 17 of the linear rail 25 are excited by the control apparatus 8 to magnetically attach the carriers 2 to the linear rail 25, the motor M1 is rotated in a clockwise direction in FIG. 1 and FIG. 2. As a result, the linear rail 25, the fall prevention guide 26, and the five carriers 2 sandwiched therebetween are inverted by 180 degrees around the rotary shaft 29, and are positioned at the descended position (state illustrated on lower side in FIG. 3).

At the descended position, the height of the placement surface of the linear rail 25 is equal to the height of a placement surface of the second conveyance rail 12, and another end (downstream end) of the linear rail 25 is connected to the upstream end 12A of the second conveyance rail 12. Since the linear rail 25 is rotated while the electromagnetic coils 17 of the linear rail 25 are excited by the control apparatus 8, and the fall prevention guide 26 is provided, the five shuttles 18 do not fall from the linear rail 25 when the linear rail 25 is inverted (see FIG. 3).

When the linear rail 25 at the descended position is connected to the second conveyance rail 12, the control apparatus 8 excites the electromagnetic coils 17 of the linear rail 25 and the second conveyance rail 12. As a result, the five carriers 2 on the linear rail 25 are moved and delivered onto the second conveyance rail 12 through the upstream end 12A.

When the five carriers 2 are delivered from the linear rail 25 at the descended position to the second conveyance rail 12, the control apparatus 8 reversely rotates the motor M1. As a result, the linear rail 25 and the fall prevention guide 26 are inverted by 180 degrees, and are returned to the ascended position illustrated in FIG. 1.

As described above, when the five carriers 2 are carried onto the linear rail 25, the first delivery unit 14 inverts the linear rail 25 from the ascended position to the descended position by the rotation unit 27, to deliver the five shuttles 18 (carriers 2) from the first conveyance rail 11 to the second conveyance rail 12. Thereafter, the linear rail 25 is inverted by the rotation unit 27 to be returned from the descended position to the ascended position. The rotation unit 27 according to the present embodiment is configured by the supporting member 28, the rotary shaft 29, and the motor M1.

The configuration of the second delivery unit 15 is the same as the configuration of the above-described first delivery unit 14. The members corresponding to the components of the first delivery unit 14 are denoted by the same reference numerals. More specifically, the second delivery unit 14 includes the linear rail 25, the fall prevention guide 26, the rotation unit 27, and the supporting member 28. These components are the same as the components of the above-described first delivery unit 14. The rotary shaft 29 is fitted to the protrusion 28A of the supporting member 28, and the rotary shaft 29 is alternately normally and reversely rotated by 180 degrees by a motor M2. When the control apparatus 8 normally and reversely rotates the motor M2, the linear rail 25 and the fall prevention guide 26 are inverted by 180 degrees alternately, to be moved to the ascended position and the descended position, in a manner similar to the first delivery unit 14.

As illustrated by a solid line at a left end in FIG. 1, the height of the placement surface of the linear rail 25 at the descended position is equal to the height of the placement surface of the second conveyance rail 12, and one end (upstream end) of the linear rail 25 is connected to the downstream end 12B of the second conveyance rail 12.

In a state where the linear rail 25 at the descended position is connected to the second conveyance rail 12, the control apparatus 8 excites the electromagnetic coils 17 of the linear rail 25 and the second conveyance rail 12. As a result, the five carriers 2 positioned on the second conveyance rail 12 are carried onto the linear rail 25 through the downstream end 12B of the second conveyance rail 12, and are stopped.

The five carriers 2 carried onto the linear rail 25 are sandwiched between the fall prevention guide 26 and the linear rail 25 (see FIG. 1).

In a state where the electromagnetic coils 17 of the linear rail 25 are excited by the control apparatus 8 to magnetically attach the carriers 2 to the linear rail 25, the motor M2 is rotated in a clockwise direction in FIG. 1 and FIG. 2. As a result, the linear rail 25, the fall prevention guide 26, and the five carriers 2 sandwiched therebetween are inverted by 180 degrees around the rotary shaft 29, and are positioned at the ascended position (see FIG. 1 and FIG. 2). Even when the linear rail 25 is inverted, the five carriers 2 do not fall from the linear rail 25 due to centrifugal force because the linear rail 25 is rotated while the electromagnetic coils 17 of the linear rail 25 are excited by the control apparatus 8, and the fall prevention guide 26 is provided.

At the ascended position, the height of the placement surface of the linear rail 25 is equal to the height of the placement surface of the first conveyance rail 11, and another end (downstream end) of the linear rail 25 is connected to the upstream end 11B of the first conveyance rail 11. Thereafter, the control apparatus 8 excites the electromagnetic coils 17 of the linear rail 25 and the first conveyance rail 11. As a result, the five carriers 2 on the linear rail 25 are moved and delivered onto the first conveyance rail 11 through the upstream end 11B.

As described above, when the five carriers 2 are delivered from the linear rail 25 at the ascended position to the first conveyance rail 11, the control apparatus 8 reversely rotates the motor M2 immediately thereafter. As a result, the linear rail 25 and the fall prevention guide 26 are inverted by 180 degrees, and are returned to the descended position illustrated in FIG. 1.

As described above, when the five carriers 2 are carried onto the linear rail 25 of the second delivery unit 15, the linear rail 25 is inverted from the descended position to the ascended portion, and the five carriers 2 are delivered from the second conveyance rail 12 to the first conveyance rail 11. Thereafter, the linear rail 25 is returned from the ascended position to the descended position.

The placement surface of the second conveyance rail 12 disposed on the lower side is directed downward. However, the fall prevention guide 26 as in the delivery units 14 and 15 is not provided below the placement surface of the second conveyance rail 12 because the centrifugal force does not act on the carriers 2 in the conveyance path (return path) of the carriers 2 by the second conveyance rail 12.

The article handling system 1 and the article conveyance apparatus 7 according to the present embodiment are configured as described above.

In the above-described configuration, operation of the article handling system 1 starts in a state where the linear rail 25 of the first delivery unit 14 of the article conveyance apparatus 7 is at the ascended position and the linear rail 25 of the second delivery unit 15 is at the descended position as illustrated in FIG. 1.

More specifically, when the control apparatus 8 excites the electromagnetic coils 17 of the first conveyance rail 11, and the empty carriers 2 holding no container 3 are moved in the arrow direction and are stopped at the supply position A, the empty containers 3 are supplied to the respective carriers 2 stopped at the supply position A by the supply robot, and are held by the grippers 22 (see FIG. 3).

Thereafter, along with movement of the carriers 2 in the arrow direction along the first conveyance rail 11, the successive five carriers 2 are inevitably stopped below the filling apparatus 4. The empty containers 3 held by the five carriers 2 are filled with the filling liquid by the filling apparatus 4.

Next, when the five carriers 2 holding the containers 3 filled with the filling liquid are moved in the arrow direction and are stopped below the capper 5, the caps are attached to the upper end openings of the respective containers 3 by the capper 5. Thereafter, when the five carriers 2 are moved to and stopped at the discharge position B on the downstream side, the containers 3 are taken out from the respective carriers 2 by the discharge robot, and are discharged onto the unillustrated discharge conveyer.

Thereafter, the five carriers 2 that have become empty at the discharge position B are moved to the downstream side, and are carried onto the linear rail 25 of the first delivery unit 14 through the downstream end 11A of the first conveyance rail 11, and are stopped. Then, the linear rail 25 of the first delivery unit 14 is rotated by 180 degrees by the rotation unit 27 so as to be positioned at the descended position, and is connected to the upstream end 12A of the second conveyance rail 12 (see FIG. 1 and FIG. 2). Along therewith, the five carriers 2 are inverted and are upside down; however, falling of the five carriers 2 from the linear rail 25 is prevented by magnetic force of the excited electromagnetic coils 17 and the fall prevention guide 26.

Thereafter, the five carriers 2 in the upside-down state on the linear rail 25 of the first delivery unit 14 are moved from the linear rail 25 to the second conveyance rail 12 through the upstream end 12A. After all of the carriers 2 are moved from the linear rail 25 of the first delivery unit 14, the linear rail 25 is inverted by 180 degrees by the rotation unit 27, is returned to the original ascended position, and is connected to the first conveyance rail 11.

On the other hand, the five carriers 2 having delivered to the second conveyance rail 12 are moved along the second conveyance rail 12 by excitation of the electromagnetic coils 17 of the second conveyance rail 12, and are carried onto the linear rail 25 of the second delivery unit 15 through the downstream end 12B (see FIG. 1). Thereafter, the linear rail 25 of the second delivery unit 15 is rotated by 180 degrees by the rotation unit 27 so as to be positioned at the ascended position. As a result, the linear rail 25 is connected to the first conveyance rail 11, and the five carriers 2 held by the linear rail 25 are put into an erected state. Thereafter, when the electromagnetic coils 17 of the linear rail 25 are excited, the five carriers 2 are moved (returned) to the supply position A of the first conveyance rail 11 through the upstream end 11B.

Thereafter, the linear rail 25 of the second delivery unit 15 is inverted by 180 degrees by the rotation unit 27. Therefore, the linear rail 25 is returned to the descended position and is connected to the second conveyance rail 12.

As described above, the article conveyance apparatus 7 according to the present embodiment includes the first conveyance rail 11 and the second conveyance rail 12 that are separately disposed, and includes the first delivery unit 14 and the second delivery unit 15 therebetween to circulate and move the carriers 2 along the circulation conveyance path R.

In the existing article conveyance apparatus having the elliptical continuous circulation conveyance path, it is necessary to install the arc-shaped conveyance paths at two positions in order to connect the forward path and the return path. Therefore, there is an issue that the installation space of the article conveyance apparatus 7 is increased.

In contrast, in the present embodiment, the arc-shaped conveyance paths at two positions that are necessary in the existing article conveyance apparatus are omitted, and the above-described delivery units 14 and 15 are provided instead. This makes it possible to reduce the interval between the first conveyance rail 11 and the second conveyance rail 12 as compared with an interval between the forward path and the return path of the above-described existing article conveyance apparatus.

As a result, it is possible to reduce the installation space of the article conveyance apparatus 7, and to accordingly reduce the installation space of the whole of the article handling system 1. Further, the article conveyance apparatus 7 has the above-described configuration, which makes it possible to increase flexibility in design for installation of the article conveyance apparatus 7.

Figure 4:
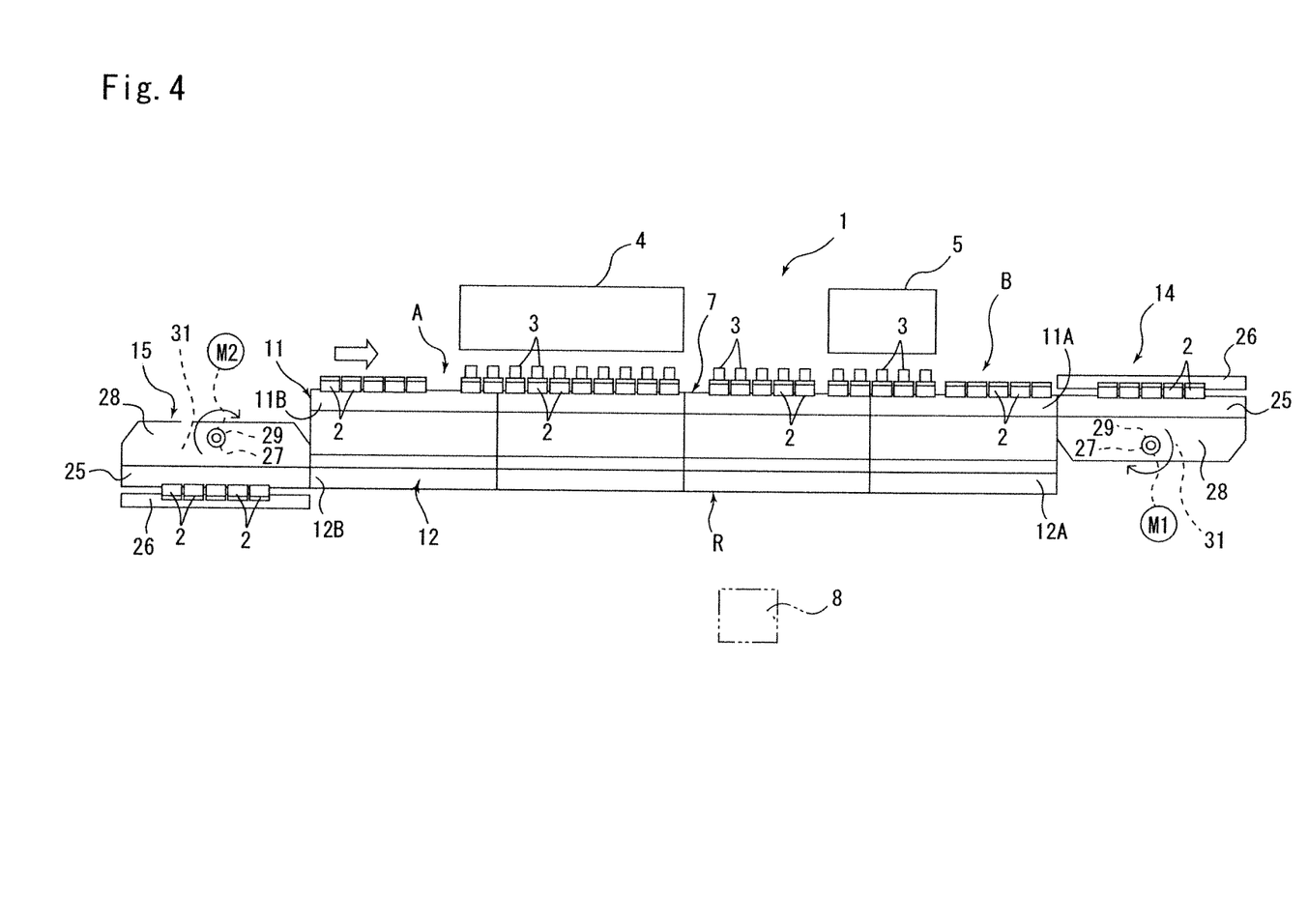
FIG. 4 is a front view illustrating a second embodiment of the present invention.
Figure 5:
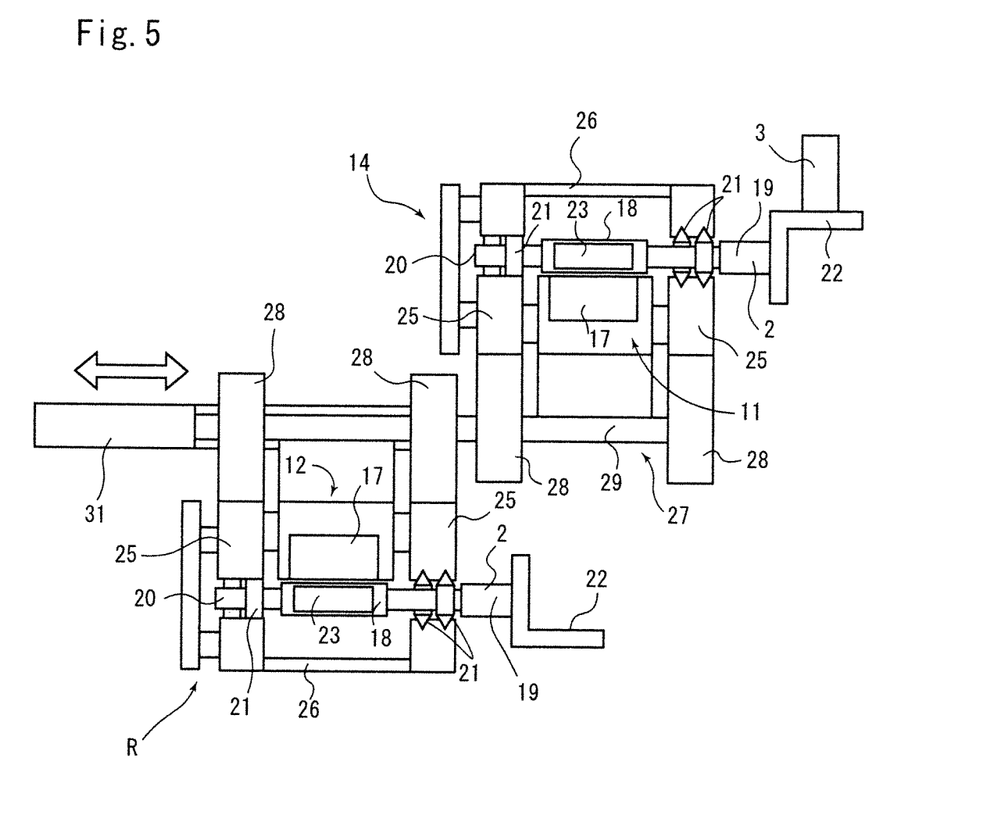
FIG. 5 is a right side view of a main part in FIG. 4.

FIG. 4 and FIG. 5 each illustrate the article conveyance apparatus 7 according to a second embodiment of the present invention. In the above-described first embodiment, the second conveyance rail 12 is disposed just below the first conveyance rail 11. In the second embodiment, the second conveyance rail 12 is disposed by being moved in parallel toward one side from the lower side of the first conveyance rail 11.

In other words, relative to the first conveyance rail 11 serving as the forward path, the second conveyance rail 12 serving as the return path is disposed at a position below the first conveyance rail 11 and displaced toward one side so as not to overlap with the first conveyance rail 11 in plan view.

Accordingly, the electromagnetic coils 17, the electric wires, and the like of the first conveyance rail 11 and the electromagnetic coils 17, the electric wires, and the like of the second conveyance rail 12 are disposed so as to overlap with each other in a vertical direction (height direction). In other words, in the second embodiment, the installation space in the height direction can be reduced as compared with the above-described first embodiment.

Further, in the second embodiment, with displacement of the second conveyance rail 12 from the position just below the first conveyance rail 11 to the side, a slide mechanism 31 that advances and retreats the whole of the corresponding delivery unit in a direction orthogonal to the extension line of the conveyance directions of the first conveyance rail 11 and the second conveyance rail 12 is additionally provided in each of the first delivery unit 14 and the second delivery unit 15. The configurations of the first delivery unit 14 and the second delivery unit 15 according to the second embodiment are respectively the same as the configurations of the first delivery unit 14 and the second delivery unit 15 according to the above-described first embodiment except for the slide mechanisms 31, and corresponding members are denoted by the same reference numerals.

Each slide mechanism 31 is coupled to the supporting member 28, and operation of the slide mechanism 31 is controlled by the control apparatus 8. When the linear rail 25 is at the ascended position, the linear rail 25 is horizontally moved onto the extension line of the first conveyance rail 11 by the slide mechanism 31. On the other hand, when the linear rails 25 is inverted and is positioned at the descended position, the linear rail 25 is horizontally moved onto the extension line of the second conveyance rail 12 by the slide mechanism 31 (see FIG. 5).

In the second embodiment configured as described above, it is also possible to achieve action and effects similar to the action and effects by the above-described first embodiment.

Figure 6:
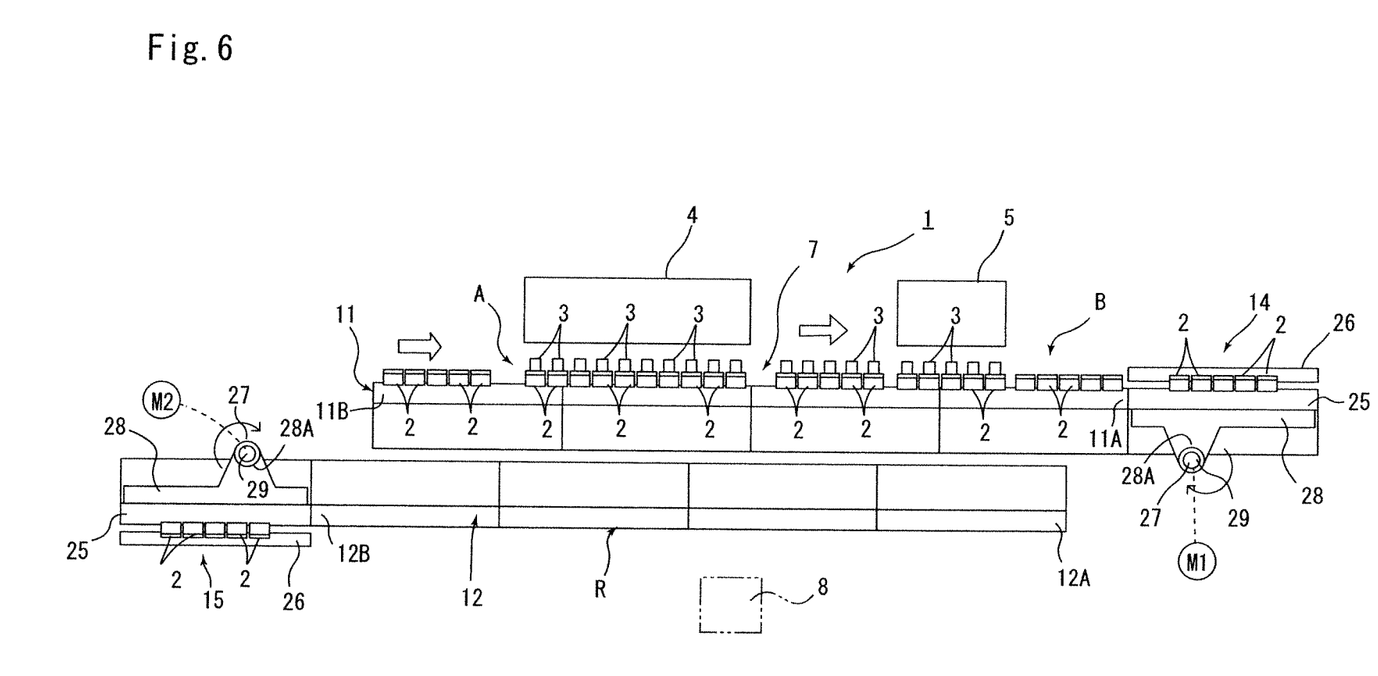
FIG. 6 is a front view illustrating a third embodiment of the present invention.

FIG. 6 illustrates the article conveyance apparatus 7 according to a third embodiment of the present invention. The third embodiment is obtained by improving the supporting member 28 and the like in each of the first delivery unit 14 and the second delivery unit 15 according to the above-described first embodiment. More specifically, in the first delivery unit 14 according to the third embodiment, the protrusion 28A of the supporting member 28 is provided not at the center in the longitudinal direction but at a position displaced toward one end side (upstream end side of linear rail 25). Further, the rotary shaft 29 is fitted into the through hole of the protrusion 28A. On the other hand, the protrusion 28A of the supporting member 28 of the second delivery unit 15 is provided at a position displaced from the center in the longitudinal direction to one end side (upstream end side of linear rail 25). The other configurations of the delivery units 14 and 15 are the same as the configurations according to the above-described first embodiment.

Further, along with the above-described configuration of the supporting member 28 in each of the delivery units 14 and 15, the second conveyance rail 12 is disposed at the position displaced toward the upstream side relative to the first conveyance rail 11 based on a displacement dimension of the protrusion 28A from the center in the longitudinal direction. The other configurations are the same as the configurations according to the above-described first embodiment, and the members corresponding to the members according to the above-described first embodiment are denoted by the same reference numerals.

In the third embodiment illustrated in FIG. 6, it is also possible to achieve action and effects similar to the action and effects by each of the above-described embodiments.

In each of the above-described embodiments, the case where the present invention is applied to the article conveyance apparatus 7 in which the circulation conveyance path R is provided along the vertical plane is described; however, the present invention can be applied to an article conveyance apparatus according to an embodiment in which the circulation conveyance path R is provided along a horizontal plane (i.e., configuration in which conveyance rails 11 and 12 are disposed in parallel in plan view, and delivery units 14 and 15 are disposed therebetween).

Further, in each of the above-described embodiments, when the linear rail 25 of the first delivery unit 14 or the second delivery unit 15 is rotated, the electromagnetic coils 17 are excited to magnetically attach the carriers 2 to the linear rail 25; however, the linear rail 25 may be rotated without exciting the electromagnetic coils 17. In this case, it is also possible to prevent the carriers 2 from falling because the fall prevention guide 26 is provided.

REFERENCE SIGNS LIST 2 carrier
3 container (article)
7 article conveyance apparatus
8 control apparatus
11 first conveyance rail
11A downstream end
11B upstream end
12 second conveyance rail
12A upstream end
12B downstream end
14 first delivery unit
second delivery unit
17 electromagnetic coil
23 permanent magnet
R circulation conveyance path

What is claimed is:

1. An article conveyance apparatus including a plurality of carriers each provided with a permanent magnet and each configured to hold an article at a required position and to be moved, a conveyance rail configured to move the plurality of carriers along a circulation conveyance path, a plurality of electromagnetic coils disposed along the circulation conveyance path, and a control apparatus configured to excite the electromagnetic coils to move the carriers along the circulation conveyance path, and configured to convey the articles held by the carriers,     the conveyance rail includes a first conveyance rail having a linear shape and serving as a forward path to move the carriers along the circulation conveyance path, and a second conveyance rail having a linear shape, disposed in parallel to and separately from the first conveyance rail, and serving as a return path to move the carriers along the circulation conveyance path,     a first delivery unit configured to rotate after receiving the plurality of carriers from a downstream end of the first conveyance rail, and to deliver the carriers to an upstream end of the second conveyance rail, and a second delivery unit configured to rotate after receiving the plurality of carriers from a downstream end of the second conveyance rail, and to deliver the carriers to an upstream end of the first conveyance rail are provided,     the circulation conveyance path is configured by the first conveyance rail, the first delivery unit, the second conveyance rail, and the second delivery unit, and     each of the first delivery unit and the second delivery unit includes a linear rail provided with a plurality of electromagnetic coils in a longitudinal direction and configured to receive the plurality of carriers, and a rotation unit configured to rotate the linear rail.

2. The article conveyance apparatus according to claim 1, wherein the first conveyance rail is horizontally disposed at a predetermined height, and the second conveyance rail is horizontally disposed below the first conveyance rail while maintaining a required interval with the first conveyance rail,     the first delivery unit is movable, by the rotation unit, to an ascended position where the linear rail is connected to the first conveyance rail and a descended position where the linear rail is connected to the second conveyance rail, and     the second delivery unit is movable, by the rotation unit, to a descended position where the linear rail is connected to the second conveyance rail and an ascended position where the linear rail is connected to the first conveyance rail.

3. The article conveyance apparatus according to claim 1, wherein the first conveyance rail is horizontally disposed at a predetermined height, and the second conveyance rail is horizontally disposed at a position below the first conveyance rail and displaced to one side,     the first delivery unit is movable, by the rotation unit, to an ascended position where the linear rail is connected to the first conveyance rail and a descended position where the linear rail is connected to the second conveyance rail, and includes a slide mechanism configured to move the linear rail to a position on an extension line of the first conveyance rail and a position on an extension line of the second conveyance rail, and     the second delivery unit is movable, by the rotation unit, to a descended position where the linear rail is connected to the second conveyance rail and an ascended position where the linear rail is connected to the first conveyance rail, and includes a slide mechanism configured to move the linear rail to a position on an extension line of the second conveyance rail and a position on an extension line of the first conveyance rail.

* * * * *